CHASSIS MOUNTING BRACKET

Filed Sept. 15, 1952

CARL J. STEINKE
INVENTOR.

BY Francis W. Crotty
HIS ATTORNEY.

1

2,708,088

CHASSIS MOUNTING BRACKET

Carl J. Steinke, Chicago, Ill., assignor to Zenith Radio Corporation, a corporation of Illinois Application September 15, 1952, Serial No. 309,603

2 Claims. (Cl. 248—223)

Figure 1:
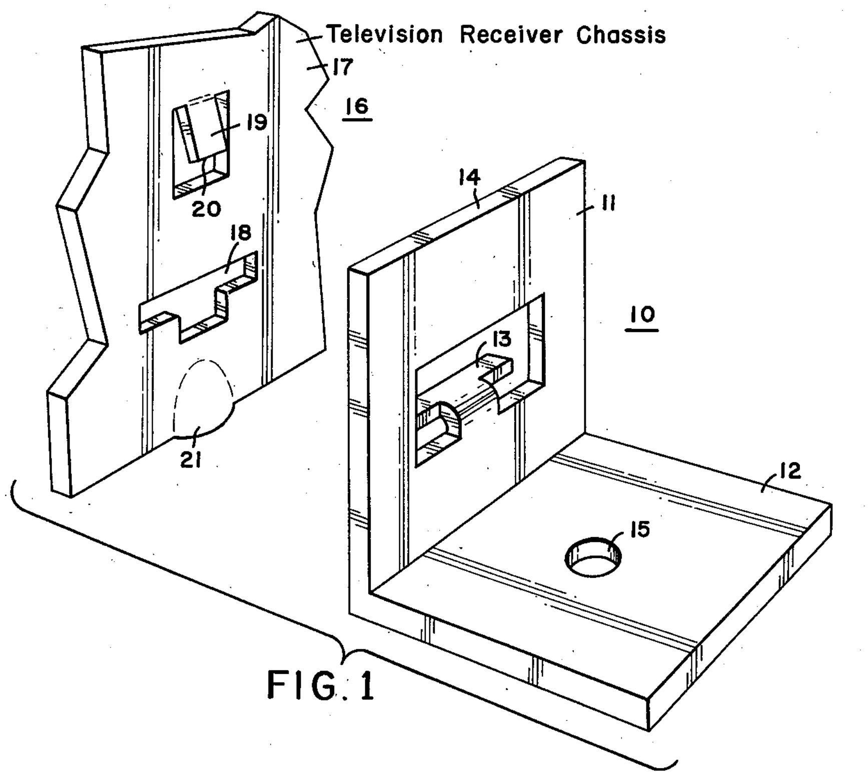

This invention relates to radio and television receivers and the like and more particularly to mechanical arrangements for mounting the receiver chassis to a cabinet or other chassis support.

It has been conventional practice for many years to provide radio and television chassis with a plurality of angle brackets adapted to be bolted or otherwise secured to a cabinet or other suitable chassis support. However, the conventional mounting brackets are constructed as simple bent metal strips each having a land portion which is riveted to the chassis side wall and an extension portion provided with a threaded hole or otherwise adapted to receive a mounting bolt. While such brackets are simple and inexpensive to construct, the riveting operation is a costly one, requiring suitable machinery and appreciable direct handling, both in performing the riveting operation itself and in routing the chassis along the assembly line. Moreover, it is not feasible to rivet the mounting brackets to the chassis after the receiver has been wired, assembled and tested, and it is therefore necessary to rivet the mounting brackets while the chassis is in the raw or unprocessed state. As a consequence, the brackets remain secured to the chassis throughout its entire progress along the assembly line, obstructing the accessibility of the receiver components for soldering operations and presenting a safety hazard by virtue of the projecting extension portions on which the production workers' clothing or persons may become damaged or injured.

It is a primary object of the present invention to provide a new and improved chassis mounting bracket of such construction as to eliminate the necessity of a riveting operation.

It is a further object of the invention to provide a new and improved chassis mounting bracket which may be assembled to the chassis subsequent to the wiring and testing operations, thus permitting greater accessibility to the underside of the chassis during such operations as well as eliminating an undesirable safety hazard.

In accordance with the present invention, a new and improved chassis mounting bracket comprises a rigid metallic bracket member having a land portion adapted to be anchored to the chassis member and an extension portion adapted to be secured to a suitable chassis support. The land portion is provided with an integral T-shaped key member which is bent outwardly at substantial right angles with respect to the land portion for engagement with a mating T-shaped key slot in a chassis wall parallel to the land portion. The land portion is further provided with a retaining surface substantially parallel to and spaced from the key member, and this retaining surface is adapted to engage a mating retaining surface of the chassis wall. In its preferred application, it is contemplated that the mounting bracket of the present invention is not to be assembled to the chassis until after all the wiring and testing operations have been completed and the receiver chassis has reached the end of the assembly line.

Figure 2:
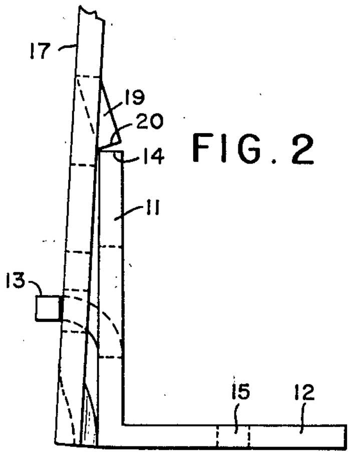

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

Figure 1 is a perspective view of a chassis mounting bracket constructed in accordance with the present invention, together with a fragmentary view of a portion of a receiver chassis which has been processed to receive the mounting bracket of the present invention, and Figure 2 is a fragmentary side elevation showing the mounting bracket in its assembled relation with the chassis.

In Figure 1, a new and improved chassis mounting bracket 10 comprises a land portion 11 and an extension portion 12 and is preferably formed by bending a rigid metal strip in such a manner that the land portion 11 and the extension portion 12 extend at right angles to each other. Land portion 11 is provided with a T-shaped key member 13 which is integrally constructed with the land portion and is preferably formed by a stamping operation. Key member 13 is bent outwardly at substantial right angles with respect to land portion 11. The top edge 14 of land portion 11 constitutes a retaining surface substantially parallel to and spaced from key member 13, for a purpose to be hereinafter described.

Extension portion 12 may be provided with an internally threaded aperture 15 or otherwise adapted to be secured to a suitable cabinet or chassis support in any conventional manner.

A fragmentary portion 16 of a television receiver chassis is illustrated in exploded mating relation with mounting bracket 10. A side wall 17 of chassis 16 is provided with a T-shaped key slot 18 suitably proportioned and positioned to receive T-shaped key member 13 of mounting bracket 10. Side wall 17 is also provided with a tongue 19 bent outwardly toward mounting bracket 10, and tongue 19 has a retaining surface 20 spaced from the bottom of the chassis by a distance substantially equal to the height of mounting bracket 10. Side wall 17 may also be provided with a dimple 21 below T-slot 18.

In assembling the mounting bracket to the chassis, key member 13 is first inserted in the cross-arm of T-shaped slot 18. The mounting bracket is then pressed downwardly, and as land portion 11 engages dimple 21, tongue 19 is depressed by the upper portion of mounting bracket 10. When the mounting bracket has been pressed downwardly to the greatest extent permitted by the height of the base portion of T-shaped key slot 18, the mounting bracket is restrained against movement either outwardly or laterally, i. e., in either of two co-ordinate directions, by virtue of the interlocking engagement of the key member and the key slot; the height of land portion 11 is so proportioned that in this condition, the top edge 14 of the mounting bracket slips below the retaining surface 20 of tongue 19, which is then permitted to spring outwardly by virtue of its inherent resiliency, thus restraining the mounting bracket against movement in the third co-ordinate direction, i. e., upwardly. The relation between the mounting bracket and the chassis wall in the assembled condition is more readily apparent from the side elevation of Figure 2.

It is of course possible to obtain similar results by providing land portion 11 of mounting bracket 10 with outwardly projecting tongues adapted to engage a mating cutout in side wall 17 of chassis 16.

In use, it is preferred that the radio or television chassis be completely wired and tested prior to the insertion of the chassis mounting brackets, of which several may be required. At the last station on the assembly line, the requisite number of brackets may be assembled to the chassis in an instant, without requiring expensive and time-consuming riveting operations. Moreover, the accessibility of the underside of the chassis for soldering and other operations at earlier stations in the assembly line is enhanced, and the safety hazard of overhanging sharp edges is effectively removed. Once assembled, there will ordinarily be no occasion to remove the mounting brackets from the chassis; however, such removal may be accomplished if desired by merely depressing tongue 19, with the aid of a suitable tool providing the necessary mechanical advantage, and then lifting the bracket upwardly and outwardly in a manner inverse to the assembly operation.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. In combination: a rigid metal chassis member having a side wall provided with a T-shaped key slot; a rigid metal bracket member having a land portion and an extension portion adapted to be secured to a chassis support; a T-shaped key member integral with said land portion and bent outwardly at substantial right angles with respect to said land portion, the base portion of said T-shaped key member extending through the base portion of said T-shaped slot to secure said bracket member against movement in either of two coordinate directions with respect to said chassis wall; one of said members being integrally provided with a tongue having a retaining surface parallel to and spaced from the cross-arms of said T-shaped key member and key slot and extending outwardly toward the other of said members, and said other member having a mating retaining surface engaging said first-mentioned retaining surface to secure said bracket member against movement in the third coordinate direction with respect to said chassis wall.

2. A bracket for mounting a television receiver chassis or the like to a chassis support comprising: a rigid metallic bracket member having a land portion adapted to be anchored to said chassis member and an extension portion adapted to be secured to said chassis support; a T-shaped key member integral with said land portion and bent outwardly at substantial right angles with respect to said land portion for engagement with a mating T-shaped key slot in a wall of said chassis parallel to said land portion; and a retaining surface on said land portion substantially parallel to and spaced from said key member and adapted to engage a mating retaining surface of said chassis wall.

References Cited in the file of this patent

UNITED STATES PATENTS

| | | |
|---|---|---|
| 614,503 | Sackett | Nov. 22, 1898 |
| 999,733 | Ashmore | Aug. 8, 1911 |
| 1,254,094 | Vogt | Jan. 22, 1918 |
| 1,718,878 | Raquette | June 25, 1929 |
| 1,736,878 | Duvall | Nov. 26, 1929 |
| 1,804,420 | Kelley | May 12, 1931 |

FOREIGN PATENTS

| | | |
|---|---|---|
| 440,660 | Great Britain | Jan. 3, 1936 |
| 489,181 | Great Britain | July 21, 1938 |